Figure 2:
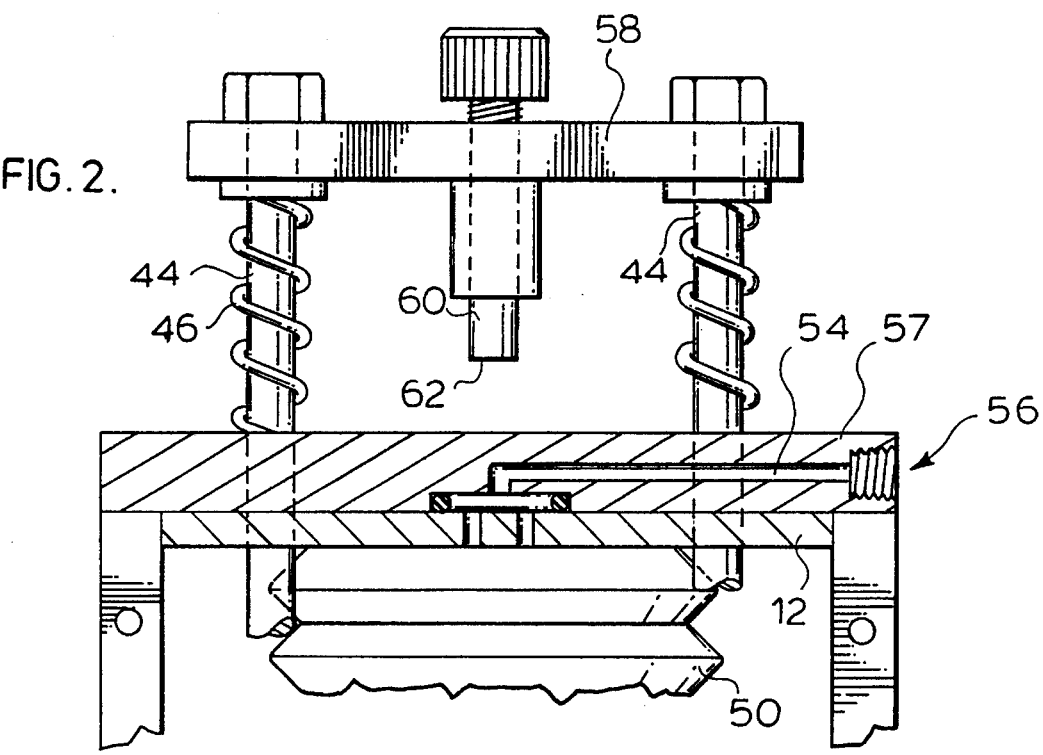

United States Patent [19]

Barnes

[11] Patent Number: 5,477,721
[45] Date of Patent: Dec. 26, 1995

[54] EDGE CONDITIONER

[76] Inventor: Austen Barnes, 168 Park Avenue, Holland Landing, Ontario, Canada, L0G 1H0

[21] Appl. No.: 319,482

[22] Filed: Oct. 7, 1994

Related U.S. Application Data

[63] Continuation of Ser. No. 964,099, Oct. 21, 1992, abandoned, which is a continuation-in-part of Ser. No. 732,928, Jul. 19, 1991, abandoned, which is a continuation-in-part of Ser. No. 619,498, Nov. 29, 1990, abandoned.

[51] Int. Cl.⁶ .................................................. B23D 1/26
[52] U.S. Cl. .......................... 72/203; 409/204; 409/298; 310/26
[58] Field of Search ........................... 72/129, 130, 199, 72/203, 245; 51/59 R, 59 SS, 61, 66, 170, 170 TL; 409/204, 207, 218, 297, 298, 303, 325, 338, 339, 342, 138; 310/26; 451/165

[56] References Cited

U.S. PATENT DOCUMENTS

| | | | |
|---|---|---|---|
| 1,070,282 | 8/1913 | Norton et al. | 409/298 |
| 1,575,184 | 3/1926 | Smith | 409/298 |
| 2,242,815 | 5/1941 | Darner | 409/303 |
| 2,318,732 | 5/1943 | Yoder | 409/303 |
| 2,729,003 | 1/1956 | Cohn et al. | 72/245 |
| 2,932,132 | 4/1960 | Schuster | 51/59 R |
| 3,254,568 | 6/1966 | Pickard | 409/303 |
| 3,336,778 | 8/1967 | Follrath | 72/203 |
| 3,377,896 | 4/1968 | De Corta | 409/138 |
| 3,400,566 | 9/1968 | Gauer | 72/199 |
| 3,426,646 | 2/1969 | Lee et al. | 409/297 |
| 3,471,724 | 10/1969 | Balamuth | 51/59 SS |
| 3,479,852 | 11/1969 | Conrad et al. | 72/40 |
| 3,664,229 | 5/1972 | Cary | 409/138 |
| 3,680,441 | 8/1972 | Parker, Sr. | 409/298 |
| 3,690,139 | 9/1972 | Brennan | 72/199 |
| 3,770,178 | 11/1973 | Olah | 72/199 |
| 4,036,105 | 7/1977 | Sukhov et al. | 409/303 |
| 4,543,022 | 9/1985 | Bonner | 409/298 |
| 4,648,762 | 3/1987 | Hall et al. | 409/138 |
| 4,961,334 | 10/1990 | Barnes | 72/129 |

FOREIGN PATENT DOCUMENTS

| | | | |
|---|---|---|---|
| 740632 | 8/1966 | Canada | 72/199 |
| 3805530 | 4/1989 | Germany | 409/138 |
| 0106712 | 8/1980 | Japan | 409/303 |
| 2185926 | 8/1987 | United Kingdom | 72/203 |

*Primary Examiner*—Lowell A. Larson
*Assistant Examiner*—Thomas C. Schoeffler

[57] ABSTRACT

An edge conditioner for travelling strip means has a tool holder which is biased away from the strip means but is actuable toward the strip by air pressure. The holder may be mounted on an arcuate support where the centre of the arc is the near edge of the strip, to allow variance of approach angles. The tool may be vibrated relative to the tool holder at between 10 and 50 KHz.

4 Claims, 6 Drawing Sheets

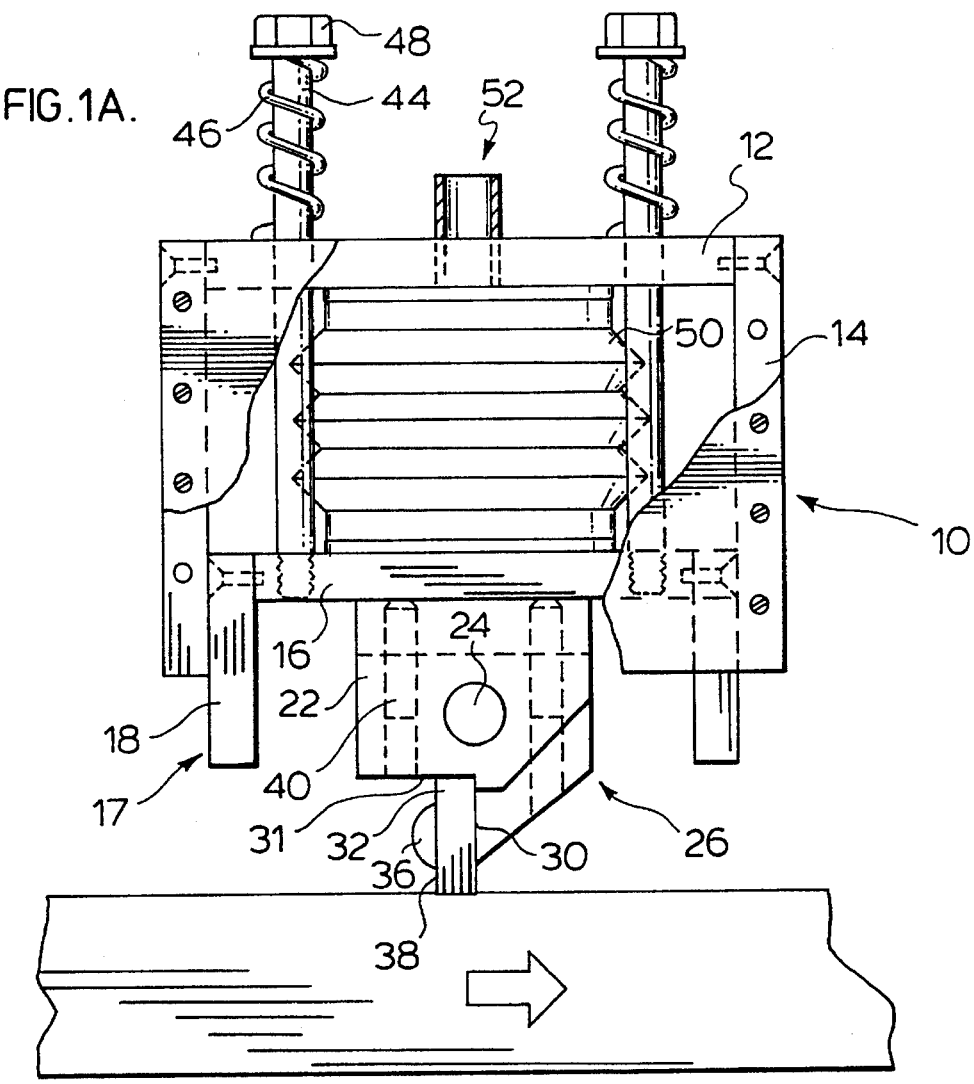
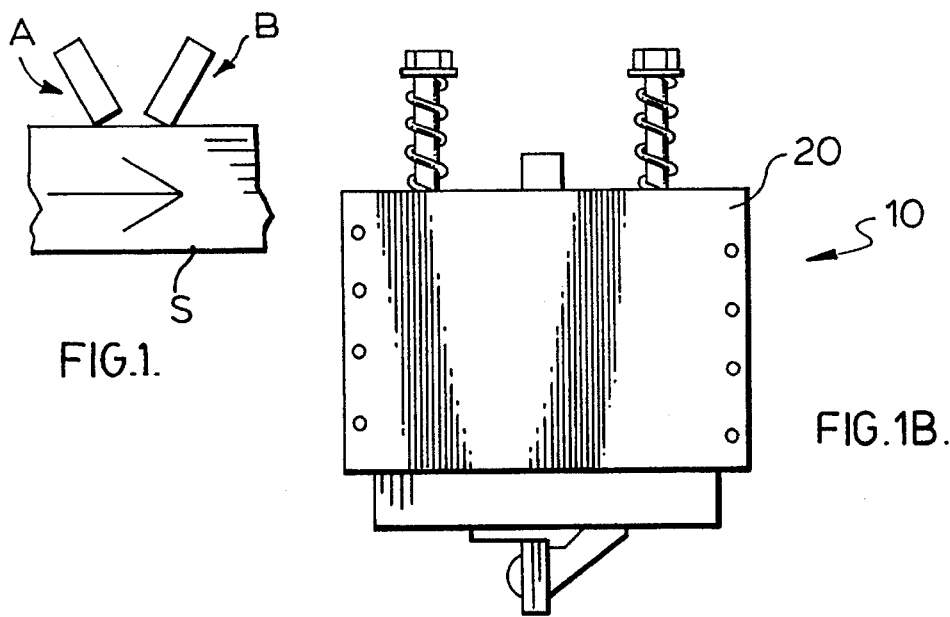

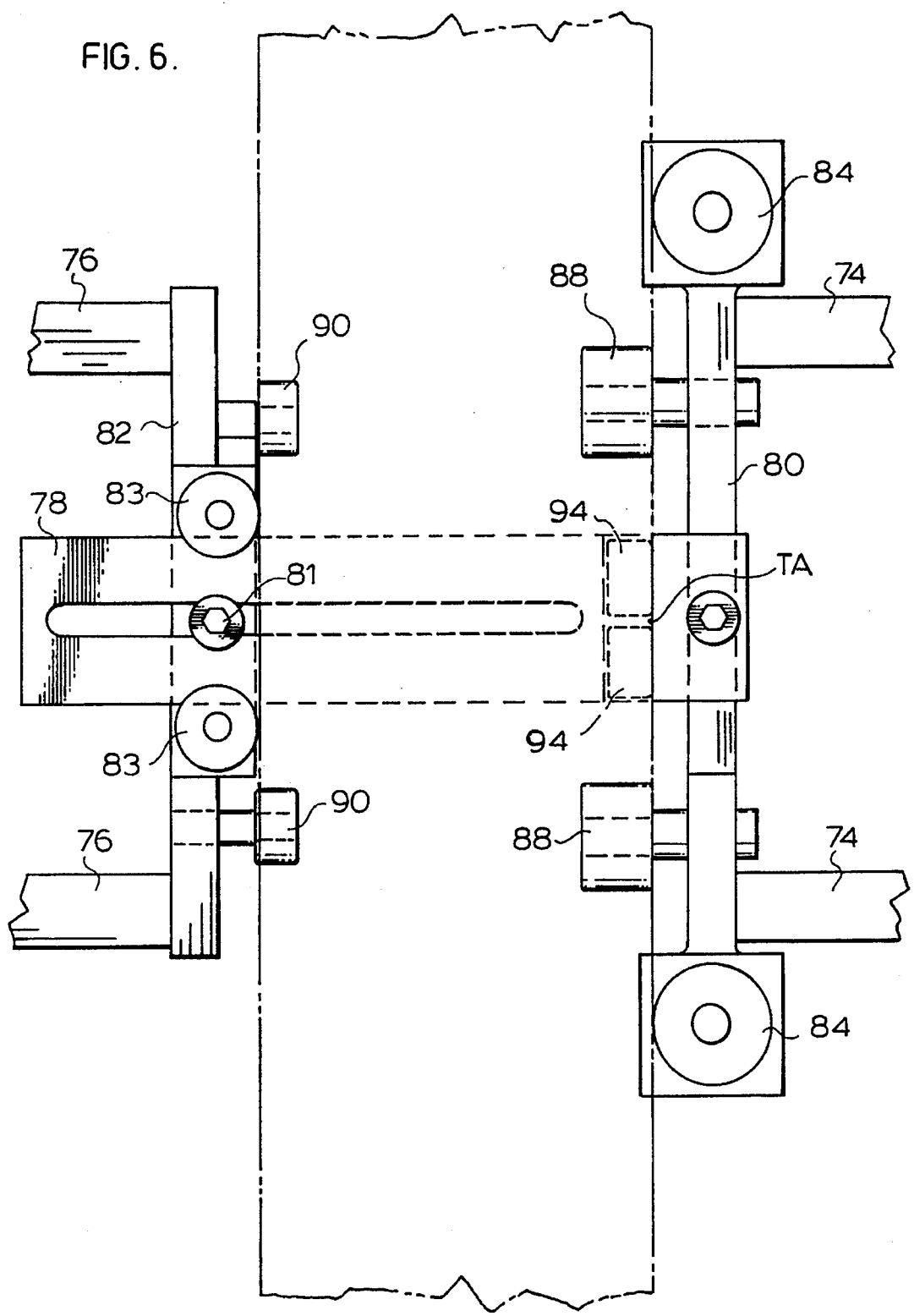

EDGE CONDITIONER

This application is a continuation of application Ser. No. 07/964,099, filed 10/21/92, now abandoned which is a continuation-in-part of application Ser. No. 07/732,928 filed Jul. 19, 1991,now abandoned, which in turn is a continuation-in-part of application Ser. No. 07/619,498 filed Nov. 29, 1990now abandoned.

This invention relates to novel and effective improvements in edge treatment tools, for the edge treatment of travelling strip material, their mounting and mounting adjustments.

By 'strip travel direction' herein I refer to such direction at the point of tool application.

By 'downstream' and 'upstream' respectively herein I refer to directions in and opposite to the direction of strip travel.

In such edge treatment the inventions to be described are adapted to cut, skive, or burnish the edges of travelling metal strip material. Such steps are cutting, skiving or burnishing involve the removal, as opposed to the re-shaping of material as opposed to its redistribution. Moreover the removal of material provides the ability to machine accurate edge profile shapes without changing the thickness or width of the material. Edge treatment is also needed to remove burrs remaining from slitting operations and is also used to form needed edge shapes to suit various applications including acting as doctor blades for the paper industry, or for obtaining exactly abutting edges in pipe and tube mills.

The treatment by apparatus in accord with the invention avoid methods of treatment which involves unwanted effects of the redistribution of material including work hardening of the edge and unwanted changes in the width or thickness of the material.

Accordingly the apparatus allowing removal of the material by cutting, skiving or burnishing are designed to provide a number of advantages over existing edge treatment techniques. Such advantages include an increased rate of material removal, and improved quality of finish. The apparatus also enables selectable angles of cut, including the ability to provide precision square edges, wedge shaped edges; or, using successive cuts of varying angles producing rounded or selectably curving edge shapes, all to a degree not achieved by prior equipment.

The equipment in accord with the invention is further designed to achieve the above recited results with a lessened risk of jamming the tooling on the material if a burr on the travelling edge becomes more severe if the material changes slightly in width or thickness. Equipment in accord with the invention provides improved material support features to prevent strip material deflection or distortion as the edges are treated. The equipment provides improved stability features for tooling for treating the edges of thin material and with such thin material for lessening the risk of tool chatter. Tool chatter frequently occurs in prior art devices.

In accord with one aspect of the invention means for edge treatment of travelling strip material includes stationary support means which mounts sliding means slidable thereon. A tool holder carrying an edge treatment tool is mounted on such sliding means to contact one edge of said strip on movement of said sliding means toward the edge of said travelling strip. Biassing means are provided for normally biassing said sliding means away from such edge. Air pressure means are provided for overcoming said biassing means, to move said sliding means so that the tool contacts said strip edge with a force determined by said air pressure means. There is thus provided precisely controllable pressure of application of the tool, while allowing it to extend or retract under such constant pressure, responsive to changes in strip dimensions. Moreover, the bias (preferably spring bias) provides for rapid retraction when the air pressure is removed.

Preferably the inventive aspect above described includes a rocker tool mount which allows the tool rake to be accurately controlled. This is particularly important for 'skiving' or shaving the material as distinct from forming the material as with former edge treatment.

In one aspect of the invention, an adjustable stop is provided which precisely limits the advance of the tool toward the strip edge. The feature of exact positioning is thus combined with resilient yieldability of the slidable means urged under air pressure in the event of undesired relative movement of the strip edge toward the tool. (Such strip edge movement is normally due to a change in strip width or thickness dimensions rather than a material displacement of the strip).

In another aspect of the invention a tool mounted on a tool holder, and controllably reciprocally slidable in a direction, is mounted on an arcuate support defining an arcuate range which allows the tool approach direction to be altered so that the tool is directed into contact with the edge from an arcuate range of directions. This arcuate range for the tool application direction, may be combined with the air pressure, retraction bias and/or the precision stop previously mentioned. The permissable arcuate range of application allows, the selection of edge angles and the successive variation of tool approach angles to provide a rounded or otherwise curving edge profile.

Novel and secure support means supporting the strip on both the tool adjacent and tool remote edge and on the side opposing tool pressure are disclosed. These means allow compensation for variation of dimensions in the travelling strip and lessen the risk of jamming or of tool chatter.

In another aspect of the invention the tool is so mounted on its tool holder to vibrate rapidly under an exteriorly applied with a substantial component in the strip travel direction and thus simulating to the tool a faster travelling strip. With the tool so mounted, slower strip speeds may be used without deterioration in the quality of tool treatment than previously thought possible, and the rate of material removal is increased at all speeds. Also, it is possible to more easily machine very soft materials such as copper and aluminum. The tool so mounted may be applied to any of the variants previously discussed.

In another aspect of the invention the tool is mounted on a rockable support with an upstream edge roller, and the tool downstream from the support fulcrum, so that increase or decrease of reactive pressure by the strip on the tool causes an opposite change in the pressure between the roller and the strip. This conveniently damps and compensates for any vibration, or localized lateral displacement of the strip edge and reduces tool chatter. The tool is located on the downstream side of the pivot axes of the rockable support, which location is found to further reduce tool chatter and damage to the strip. Arrangements are made to resiliently damp the oscillations on the rockable support, further reducing the risk of tool chatter or of damage to the strip under lateral or other edge shift.

With the arrangement just described, the beneficial effects are enhanced if the supporting slide means for the rockable support is provided with an additional edge contacting roller for contacting the strip edge downstream from the tool of the rockable support.

In all aspects means may be provided for providing opposed tools acting at approximately the same location on opposite edges of the strip.

Figure 3:
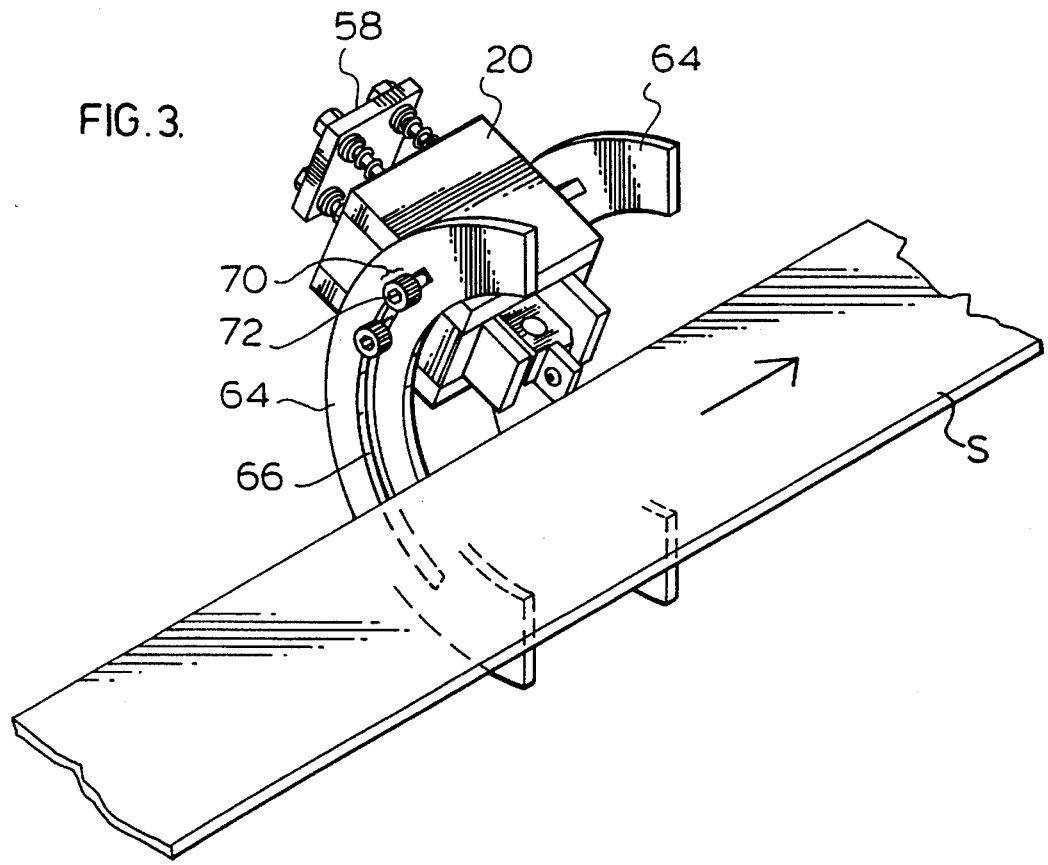
Figure 4:
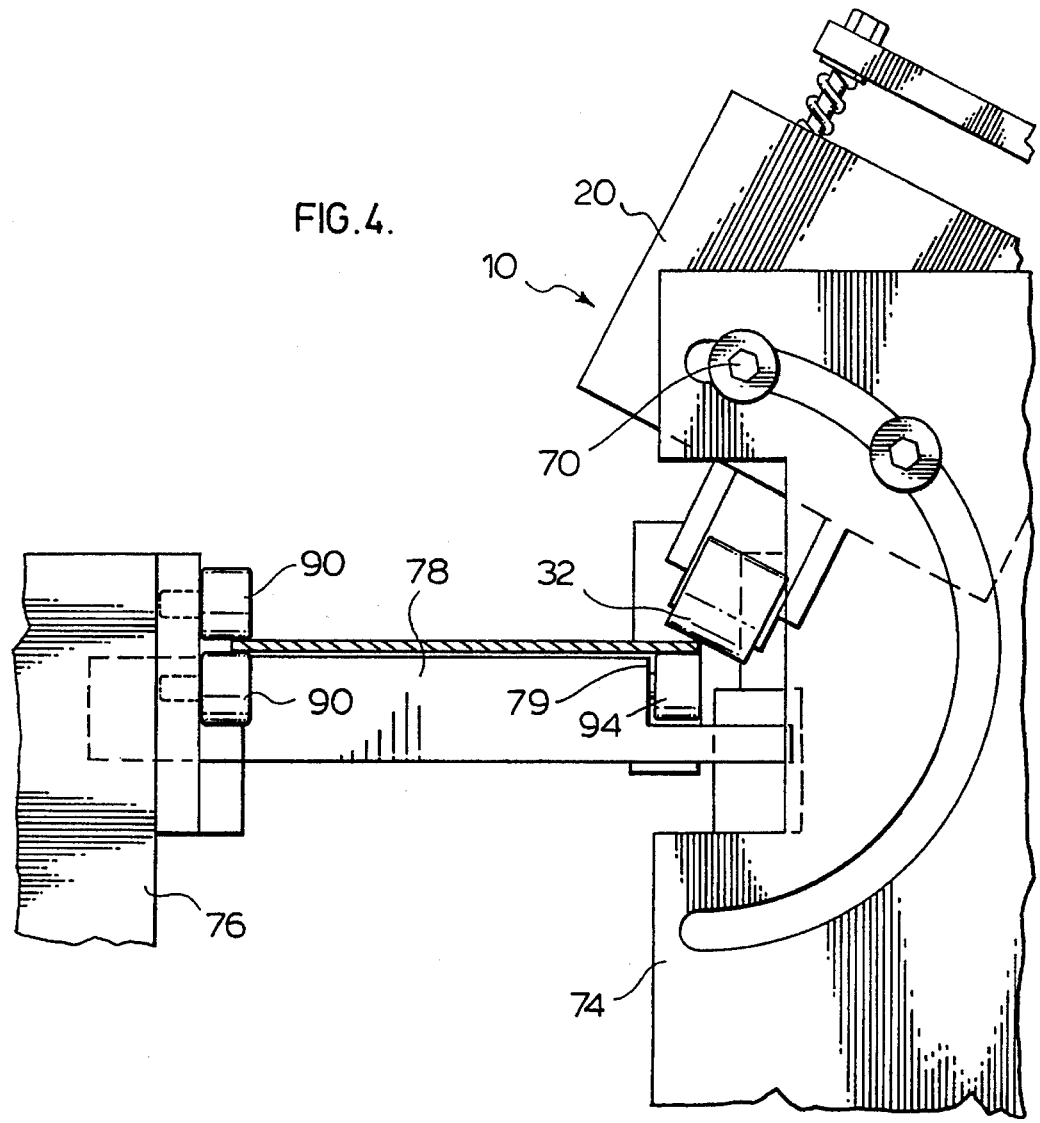
Figure 5:
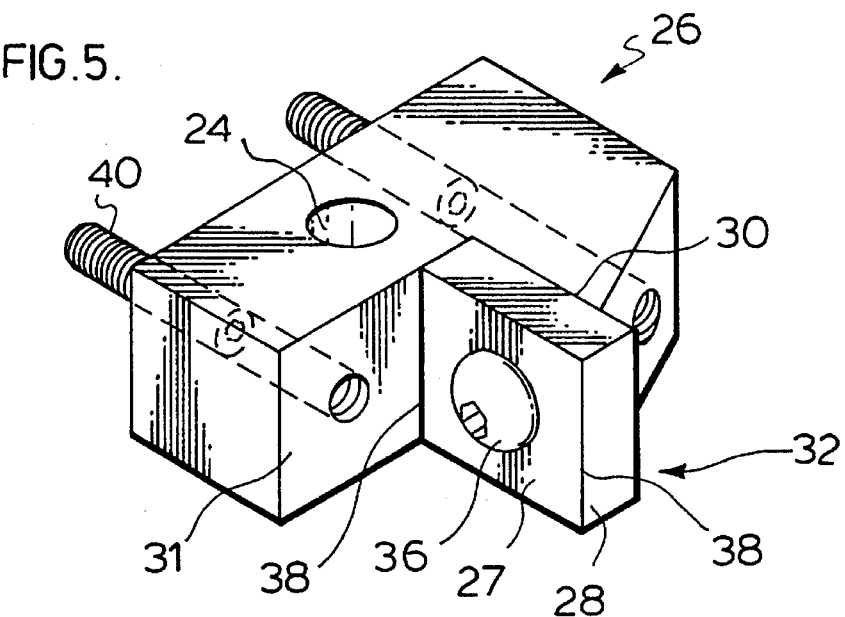
Figure 5A:
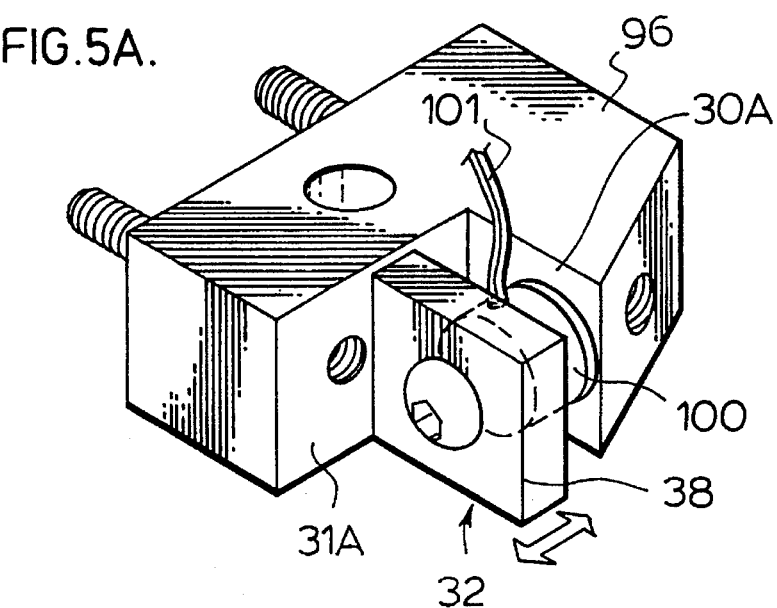
Figure 5B:
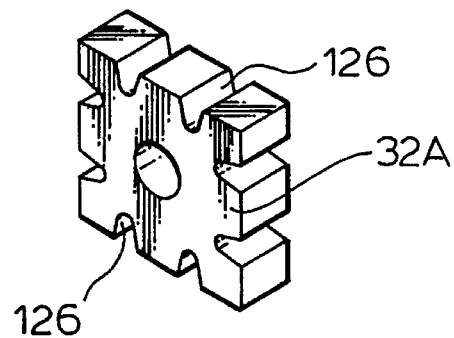
Figure 7:
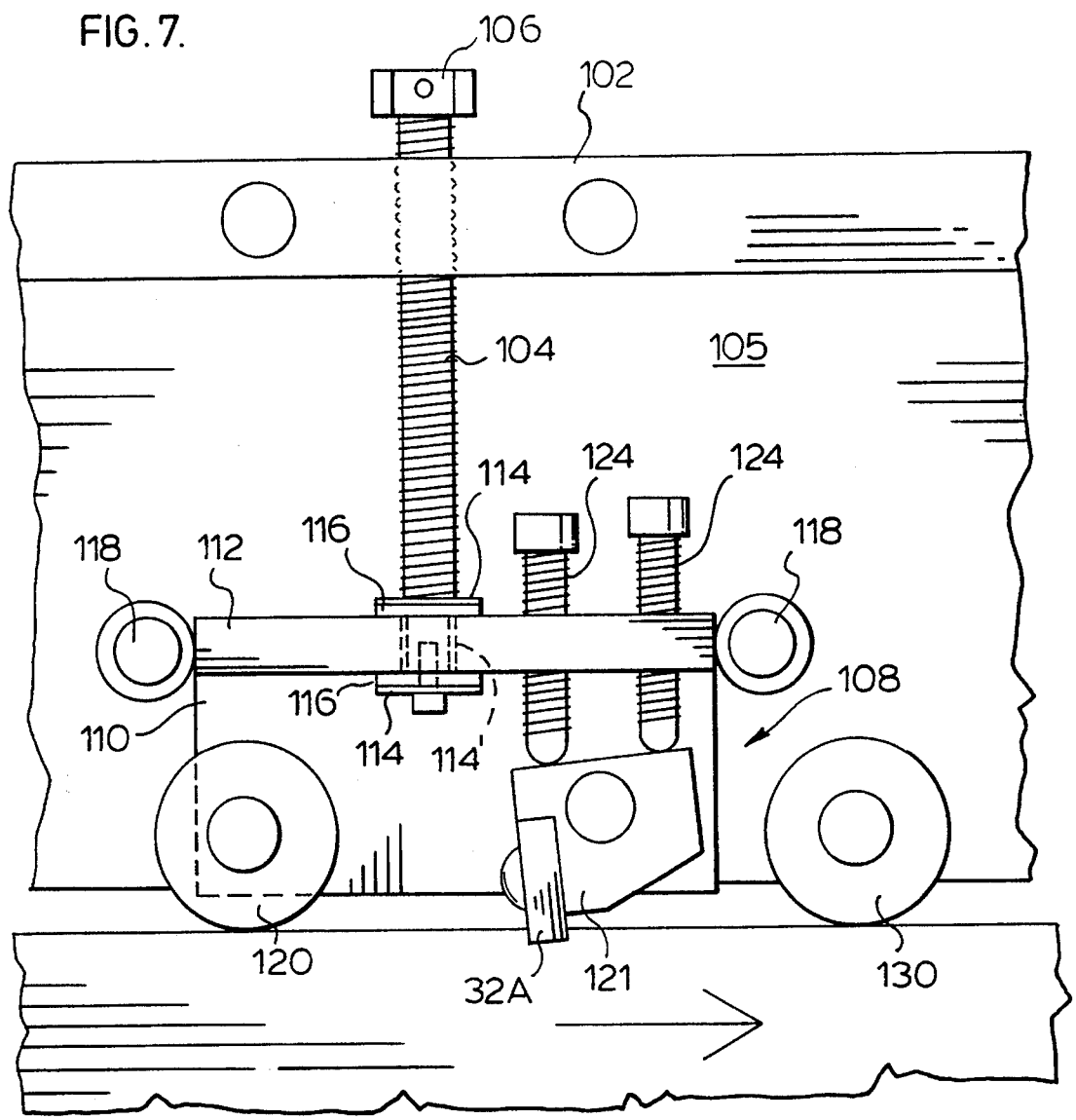

In drawings which illustrate a preferred embodiment of the invention:

FIG. 1 schematically demonstrates tool angles,

FIG. 1A illustrates a plan view, with cover plates removed, of a tool support in accord with the invention, FIG. 1B shows an outside view of the tool holder of FIG. 1A with the cover plates, FIG. 2 shows an alternative construction to that shown in FIG. 1A, FIG. 3 shows an arrangement wherein the tool holder of FIG. 1A or 2 may be moved in an arc about an axis in the strip travel direction, FIG. 4 shows an arrangement showing the use of the invention in apparatus dealing with varying strip widths, and omitting the tool and tool mounting which are shown in FIG. 3, FIG. 5 shows a tool mounted on an rocker mount, FIG. 5A shows an arrangement for tool vibration in the strip travel direction, FIG. 5B demonstrates an alternate form of tool, FIG. 6 is a plan view of some components of FIG. 4, FIG. 7 shows an arrangement for mounting tools to avoid tool chatter, FIG. 1 demonstrates, in relation to a travelling strip travelling in the direction shown; in attitude A, the attitude of tool 32 for material removal, that is cutting, skiving or burnishing which are the recommended operations with the apparatus of this invention. The tool 32, attitude B, is mainly for material reshaping as opposed to removal which is not recommended, except for very soft materials such as soft copper and aluminum, which do not cut well. However, with such soft materials this is, to a substantial extent a burnishing process with some material removal.

FIG. 1A, there is shown a support for the tool 32 best shown in FIGS. 5 and 5A. Although tools for other operations may be used with apparatus in accord with the invention, note that it is in accord with the preferred techniques taught herein to skive, cut the material, or burnish it. Thus all the preferred techniques involve the removal as distinct from the reshaping of material.

The process of directly cutting, skiving or burnishing the edges of continuously processed metal strip provides benefits over rolling, such as the avoidance of work hardening the edge, providing material removal as opposed to reshaping accurate edge profile shapes without changing the thickness or width of the material. Edge treatment, preferably by skiving is thus preferably used to remove burrs remaining from slitting operations and to form edge shapes to suit various applications.

In the drawings with principal reference to FIGS. 1B and 1A mount 10 is mounted in any desired manner, not shown, in relation to the travelling strip.

FIG. 1A shows the mount of FIG. 1B but with the cover plate removed.

Mount 10 may be so mounted to be stationary relative to the strip path but will usually be mounted on a carriage (not shown here) which allows the mount 10 to be advanced toward or retracted away from the strip. An example of such a carriage mount is shown in FIG. 6. Mount 10 includes the back plate 12 and the side plates 14 to define in plan, a rectangular U-shape open toward one edge of the strip. A second U-shaped sliding frame 17 comprises back bar 16 and side bars 18 and is designed to slide reciprocally in mount 10 in the direction toward and away from the strip. As shown in FIG. 1B stationary mount 10 is provided with top and bottom plates 20 (only the top plate is shown and is omitted from FIG. 1) and the members are designed so that hide plates 14 and plates 20 form a guideway for the sliding of sliding frame 17.

Projecting rearwardly from bar 16 are four rods 44 fastened rigidly to bar 16 in any desired manner and slidable in bores in back plate 12. Compression springs 46 about the rearwardly projecting portion of rods 44 bear at one end of back plate 12 and at the other on heads 48 on shank 44. A bellows 50 of commercially available construction is provided with an air supply at port 52, from means not shown and bears on the back plate 12 and back bar 16. Thus when no air pressure is supplied at port 52 the bellows is collapsed and the sliding frame is retracted by springs 46, away from the strip. When air pressure is supplied at port 50, the sliding frame is moved toward the strip against the bias of springs 46. When the air pressure is again removed the springs again retract the side frame.

Opposed side plates 22 (only the upper is shown) are bolted or welded to back plate 16 and will be found to define planes parallel to the strip travel direction. Pivot pin 24 extends between plates 22 to pivotally mount toolholder 26, also shown in FIG. 5. The tool holder provides a face 31 generally oriented to face the proximate strip edge and a shoulder 30 perpendicular thereto. The tool 32 in its preferred rectilinear form is substantially square in front view with short side faces 28.

Tool holder 26 (FIGS. 1A and 5) provides a face 31 which generally faces the proximate strip edge and a shoulder 30 perpendicular to face 31 and facing upstream relative to strip travel. The tool 32 in its preferred form is preferably a rectilinear body with square front and rear faces and separated by a dimension short with reference to the sides of the square. A bore not shown extends through the tool centrally of the square faces and is adapated to align with a threaded bore, not shown, in shoulder 39. Thus bolt 36 is extended through the tool bore and screwed into the shoulder 30 bore to mount the tool in place. The tool when mounted is dimensioned so that one of its square faces abuts the face 31 to support the tool firmly in place. Different tools may be used although I prefer to use a rectilinear tool as described where the four edges 38 of the upstream square are designed as cutting edges. The opposed edges may also be cutting edges so that the tool may be turned around when worn.

The rectilinear tool of FIG. 5 and 5A is preferred for use with the apparatus as shown in FIGS. 1–4. With the embodiment of the invention shown in FIG. 7 it is possible to use the notched tool 32A of FIG. 5B with the strip edge received in one of the notches. Since the notches are off center a similarly off center tool holder (not shown) is used. By rotation of the tool or tool holder about their various axes of symmetry each notch may then be brought into registration with the strip edge. Other tools may, alternatively be used within the scope of the invention.

Thus, on the tool holder 26 as described, a setscrew 40 is provided on each side of pivot 24, each setscrew extends parallel to the square faces of the tool, to bear on the strip-proximate face of back bar 16. It will be appreciated that setscrews 40 may be adjusted to control the cutting angle or 'rake' of the tool 32 to the proximate edge of the travelling strip.

Thus, the device of FIG. 1A with mount 10 mounted, by means not shown, to the side of the travelling strip path will have no air pressure at port 52 and slidable frame 17 retracted by springs. The desired tool angle is set by setscrews 40. With the strip travelling at the desired speed for the selected metal treatment, air pressure is admitted to port 52 to advance the sliding frame until tool 32 contacts the strip edge. At this point the tool will perform its desired operation on the strip. The pressure exerted by the tool on the strip is determined by the air pressure. At a given pressure a lateral displacement or change of width or thickness dimension of the travelling strip will be compensated by movement of the tool against or with the air pressure.

When the tool is to be retracted the pressure is removed and the tool and sliding frame retracted by springs 46.

It should be noted that any guideways may be used for guiding a sliding (tool holding) frame relative to a mount such as 10, and used as an alternative to the means shown.

In FIG. 2 where parts common to FIG. 1 are omitted, the arrangement described in FIG. 1 is varied to provide a lateral air inlet 56 from an air supply, (not shown), along bore 54 for the bellows along sub plate 57 fixed to stationary mount bar 12. Coupling bar 58 joins the strip remote ends of rods 44 which are biased outwardly by compression springs 46. A micrometer type adjustable stop 60 is shown in FIG. 2 with stop face 62 facing sub plate 56. The micrometer selected is of the type to accept the impacts and pressures at its end 62 and to act as a stop to movement of the sliding frame 17 toward the strip at the precise spot determined by the setting of the micrometer. The embodiment of FIG. 2 thus provides the advantage of a precise location for the tool, rather than the constant pressure of the device of FIG. 1. The pressure of bellows 50 does however determine the reactive pressure of the strip on the tool 32 required to cause retraction (under contact with the strip) of the latter. The bias of springs 46, as in the device of FIG. 1, causes immediately retraction, of the tool, away from the strip, when the bellows pressure is removed.

FIG. 3 shows the tool mount of FIG. 1 or 2 mounted on the arcuate guides 64 for action on the strip edge through a wide arcuate range (preferably about 140°), so that the tool thus mounted may approach either the upper and lower corner of the strip edge. If desireable the tool mounting including the arcuate guides may be mounted to be inverted (and the tool reversed) to provide apparatus for treatment of the Strip which apparatus is a mirror image of that shown, about a plane corresponding to the median plane of the strip at the point of treatment.

In the apparatus shown in FIGS. 3 and 4 the arcuate strips 64 are mounted, to be stationary relative to the strip path, by means not shown. The arcuate strips 64 define arcuate slots 66. The components of FIG. 1A (or FIG. 2) in assembled form as generally indicated in FIG. 1B, are provided on each side with a pair of mounting bolts 70 which ride in the adjacent slots 66 so that the desired tool approach angle may be attained by moving the component 10 to the desired, corresponding orientation and tightening nuts 72 on the four bolts 70 to lock the column and tool in the desired position. Alternatively, four separate bolts can be used, threaded into the unit, instead of through bolts and nuts. The tool may then be used at the selected approach angle as described in connection with FIGS. 1 and 2 and of course the rocker tool angle, is set by setscrews 40.

FIGS. 4 and 6 show apparatus for using the arcuate slotted arrangement of FIG. 3. In FIGS. 4 and 6, the arcuate plates 64 are replaced by rectilinear plates 74 which, however, have the arcuate slots 66 and arcuately moving mount 10 already described. Rectilinear plates 74 are partially shown in FIG. 6 but the tool mount 10 and slotted portion of plates 74 are omitted for clarity. Carriages, not shown are mounted to selectably move toward and away from the strip. One carriage carries the plates 74 on the tool side of the carriage and another carriage mounts the pair of plates 76 on the opposite side. Each carriage will be combined with means for advancing and retracting it relative to the strip.

A slide plate 78 is attached to and extends rigidly from bar 80 which rigidly joins the plates 74. A bar 82 rigidly joins plates 76. The slide plate 78 runs beneath the travelling strips and transversely thereto and is slotted, transverse to the strip travel direction. A bolt 81 is threadedly mounted in bar 82 which joins the plates 76. Thus the bars 80 and 82 may be advanced and retracted relative to each other, as desired, and bolt 81 tightened at the desired setting. However, the preferred use of the bolt 81 is to have it normally in loose sliding relationship to slide plate 78, as hereinafter described.

Bar 80 mounts vertical axis rollers 84, adjacent each end, which rollers guide the edge of strips and or are preferably, with bar 80 and its associated carriage, biassed toward the strip to set its lateral location. Similarly bar 82 mounts vertical axis rollers 83 (preferably just up and downstream from slide 78) to guide the opposite side of the strip.

On bar 80, upstream and downstream from the tool application point TA are supplied with pairs of horizontal axis rolls 88 which receive the adjacent edge portion of the travelling strip between them and support it from above and below. Similarly on bar 82 upstream and downstream from the edge location opposite point TA there are pairs of horizontal rolls 90 to support the adjacent portion of the travelling strip between them, from above and below. In addition, a pair of horizontal rolls 94 mounted on bar 78 support the strip from below in the vicinity of the tool applicator point TA, and support it against the strip perpendicular force exerted by the tool on the strip. Provision (not shown) may be made in the apparatus for providing the equipment of horizontal rolls 94 to support the strip from above when the tool application is from below. As demonstrated by FIG. 4 bar 78 is stepped at 79 to allow the correct positioning of rolls 94 below the strip.

In operation then the carriages holding bars 80 and 82 are adjusted so that the pairs of edge guide rollers 84 and 83 contact the opposite sides of the strip. The biassing for the bars will then maintains the edge guide rollers 84 and 83 in each contact. The two rollers pairs 88 and the two roller pairs 90 are located on opposite sides of the strip, for its support transverse to the strip plane. Rollers 94 are located below the strip. Tool 32 is set at the desired treatment angle by setscrews 40 and the mount 10 in the arcuate support 64 is set and bolts 70 tightened. The tool is retracted by springs 46 in the absence of pressure from bellows 50. When the strip is travelling at an acceptable velocity for cutting to take place, the required amount of air pressure is applied to overcome the retractive bias of compression springs 46 and cause the tool to engage the strip either with the pressure determined by the bellows 50 or at the location determined by the micrometer 60.

FIG. 5A shows an improved support for providing a vibrating tool head. The tool head vibrating at about 30 KHz with a substantial component in the strip travel direction allows lowering of the minimum speed of the strip for cutting to take place from 40 ft/min. to almost 0. The tool head comprises the rocker mount 96, with support surface 31A and backing shoulder 30A. A linear magnetostrictive vibrator 100 connected to a radio frequency source by leads 101 is bolted at one end to shoulder 30A and has the tool 32 bolted to the other. The tool 32 is also slidably supported by support surface 31A. For use the tool holder and tool are mounted for any of the applications shown in FIG. 1–4 or 6 and in operation, on application of the tool, the RF source is connected and the vibrating tool applied at the (reduced) speed allowed by the use of the vibrating tool mount.

In FIG. 7 is shown means for mounting a tool 32A in relation to a travelling strip designed especially for thin materials. It should be understood that for many applications it will be desirable to work on both sides of the strip simultaneously. Thus, it may be assumed, that for many applications the similar equipment will be provided on the opposite side of the strip, mirror imaged about the break line shown. If similar apparatus is not used on the opposite side of the strip it will be supported by edge and/or other rollers as necessary.

A mount 102 mounted in relation to the travelling strip path, by means, not shown, carries screw mounted control shank 104 operable by control knob 106 to advance and retract a sub-carriage 108 relative to the strip edge. In the preferred mode of use similar carriage, tool and other apparatus to be described are provided in the similar relationship not shown to the other edge of the strip. The apparatus on the unshown side is a mirror image of that shown about a plane perpendicular to the strip and parallel to its travel direction. Mount 102 includes support surface 105 being a plane parallel to the plane of the strip at the point of treatment on which is slidably movable the sub-carriage 108 comprising sliding plate 110 and its upstanding flange 112.

Control shank 104 is rotatably mounted in flange 112 with a deliberate clearance 114' to allow the flange 112 and sub-carriage 108 to rock on the shank 104. Shank 104 is provided with washers ion both sides of flange 112 and stopped against axial movement. Each washer is a dual layer, comprising a steel washer 114 remote from the flange 112 and a resilient, preferably rubber washer 116 next to the flange 112. The flange and sub-carriage are therefore free to rock on the shank 104 about rocking axes perpendicular to the surface 105 up to the limits provided by clearance 102 and as damped by resilient washers 116. Pillars 118 projecting from surface 105 are located just upstream and just downstream with a small clearance from flange 112 to support, from time to time, the sub-carriage 108 against more than rocking movement under the reactive pressures of the strip on the tool.

Mounted on sub-carriage 108 upstream of shank 104 is grooved roller 120 with axis perpendicular to the plane of the strip designed to contact and roll on the edge of the strip. Mounted on sub-carriage 108 downstream of shank 104 a rocker tool mount 121 pivotally mounted on shaft 122 rigidly projecting from surface 108 is mounted to assume the attitude determined by set screws 124 which are threadedly mounted in flange 112. Tool mount 121 mounts the tool 32A to contact the edge of the travelling strip. Although the tool is shown as having only one attitude relative to the plane of the strip about its mounting axis defined by bolt 24 it must be remembered that many shapes of tool are available. That is the cutting edge of the tool need not be perpendicular to the plane of the strip but may be provided with edges making an angle other than 90° with the edge of the strip. For example FIG. 5B shows a tool 32A with a pair of specially shaped notches 126 in each side. The toolholder must be proportioned to place the desired surface of the desired notch in contact with the strip. Generally many tool shapes may be used.

Surface 105 mounts a grooved edge contacting roller 130 downstream from the tool and sub carriage.

In operation mount 102 is located proximity of the strip by means not shown. Shank 104 will be in an orientation to hold sub-carriage 108 retracted so that the rollers 120, 130 and the tool are out of contact with the proximate edge of the travelling strip. The shank 104 is then rotated until the tool and grooved roller, 120 will contact the edge of the strip. The attitude of tool 32A has been chosen by the adjustment of setscrews 124. The setting of shank 104 will then determine the operations interference of tool and strip edge. In operation the thin travelling strip may cause tool chatter. Should this occur the rocker sub-carriage damps this out because the rolls 120 (in a trunion type) combination with the tool 124 and in combination with roll 130 damp this out. The resilient washers 116 allow the permissible rocking with an added damping effect. The pillars 118 limit motion of the sub-carriage to rocking only.

I claim:

1. An edge conditioner for travelling strip material, defining a plane and having opposed strip edges defining a strip travel path and a plane at a point of treatment, support means, sliding means associated with said support means said support means being adapted to guide said sliding means for sliding movement toward and away from said strip material, thus defining a linear sliding direction directed toward an edge of such strip, a tool holder mounted on said sliding means mounting a tool for contacting an edge of said strip material, said tool being non-rotatable; mounted, shaped and oriented to remove material from said strip, means for controllably moving said tool in relation to said edge in said sliding direction, arcuate means defining an arcuate path for said support means, which path is centered about an edge of strip material on said path, adapted, in combination with said support means and said sliding means to provide a range of angles for the said linear sliding direction.

2. An edge conditioner as claimed in claim 1 including at least one pair of grooved rollers for supporting the opposed strip edges and rollers for supporting the strip material against displacement perpendicular to the plane of the strip material.

3. An edge conditioner as claimed in claim 1 wherein said arcuate means defines an approach direction for said tool to said strip material edge, and roller means are provided for contacting and rolling on said strip material and approximately aligned,with said approach direction, for supporting said strip material against deflection by said tool.

4. Tool holder for edge treatment of travelling strip material defining a strip travel direction, including: shoulder support, a magnetostrictive transducer having opposed ends and adapted to respond to an AC signal to alter the distance between said ends in accord with said signal, one end of said transducer being mounted on said shoulder and the other end of said transducer mounting a non rotating edge treatment tool, wherein said shoulder, transducer and tool are oriented so that the distance between said ends is measured with a substantial component in the strip travel direction.

* * * * *